May 8, 1951        B. J. SCHILL        2,551,853
AGITATOR FOR GRAIN DRILLS
Filed March 7, 1945
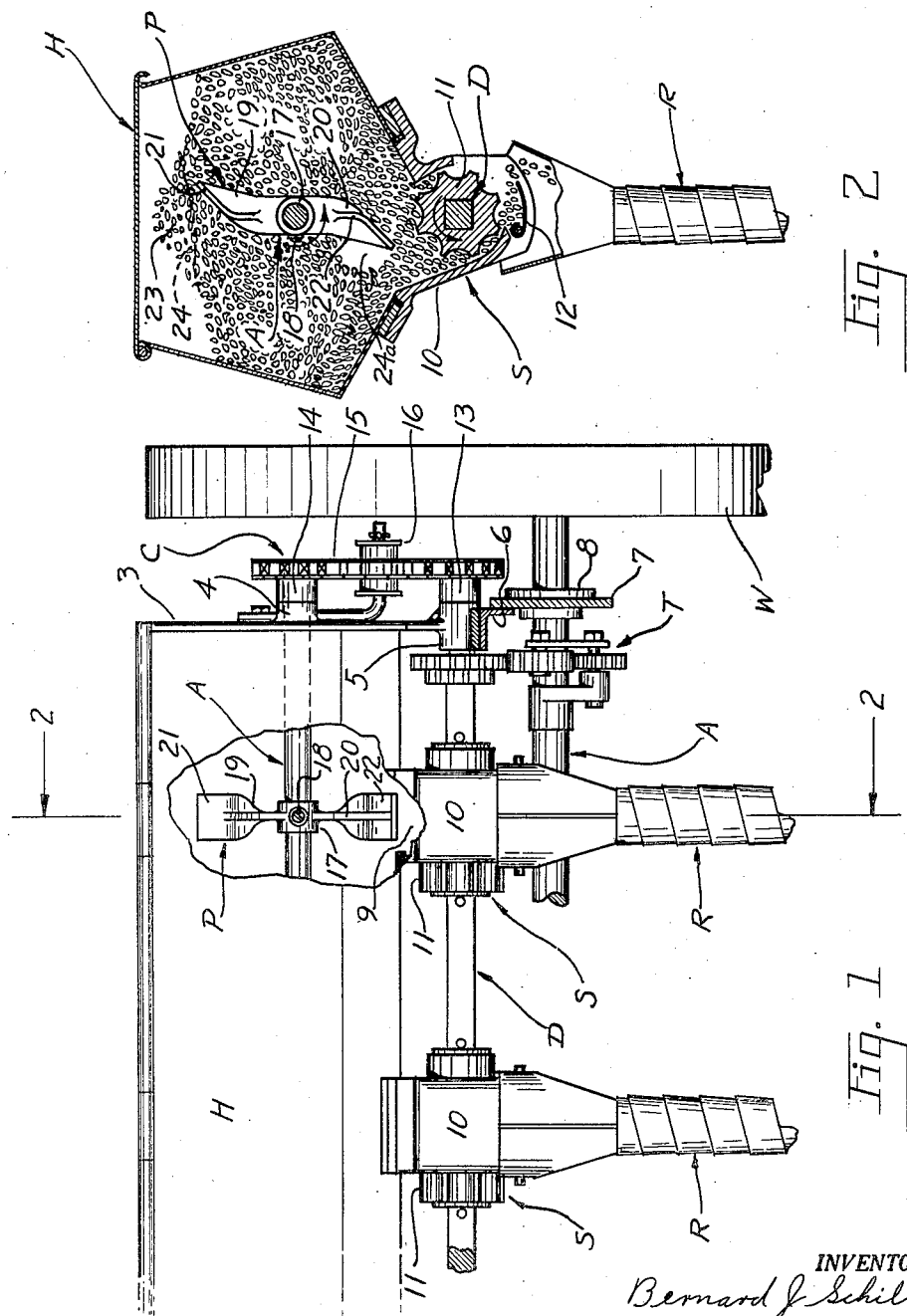
INVENTOR.
Bernard J. Schill
BY
Emerson B. Donnell
ATTORNEY.

Patented May 8, 1951

2,551,853

UNITED STATES PATENT OFFICE 2,551,853

AGITATOR FOR GRAIN DRILLS

Bernard J. Schill, Rockford, Ill., assignor to J. I. Case Company, Racine, Wis., a corporation of Wisconsin Application March 7, 1945, Serial No. 581,524

1 Claim. (Cl. 259—133)

The present invention relates to grain drills and especially to grain drills which are used to plant bearded oats and other seeds that are difficult to plant owing to appendages attached thereto and an object of the invention is to generally improve the construction and operation of devices of this class. These appendages often called beards, tend to interlace with each other resulting in the seeds forming a non-flowing or suspended mass in the hopper. This is very troublesome in that the seeds will not flow to the seed cups by gravity. It is known practice to place rotating agitators in the hopper at the mouths of the seed cups to keep the seeds in a flowing condition. Agitators as so far known, however, fail to solve the problem in that the seeds beyond the ends of the agitator blades may interlace in spite of the agitator.

Having gotten into the seed cup, it is also possible that the seed may refuse to flow to the fluted roller so that it can be carried to the feed tube or ribbon tube. This is especially troublesome when sowing such seeds at high rates or in large quantities per acre.

The seed sometimes unavoidably contains appreciable quantities of trash and it is also necessary that this trash be forced through with the seeds and not interfere with the flow.

Specifically, the trouble rests with the tendency of the seed to "bridge" over the seed cup opening in the hopper. The "bridging" may extend beyond the agitator paddle if the latter is of the usual design, thus nullifying the action of the agitator, the latter merely cutting a groove in the mass of seeds and rotating freely therein.

While the ribbon tubes that convey the seed to the furrow are usually open at the top for observation, the bridging and consequent interruption of the feed may not be noticeable from a cursory glance, especially when the drill carries a large number of seeding units. It is not possible to know the duration of such bridging or when it will occur and the result is that the field will have portions at random which are devoid of seed and which result in a loss of crop.

It is the principal object of this invention to obviate the above mentioned difficulty of bridging by the seed, and to insure a constant and uniform flow of seed to the furrow.

A further object of this invention is to provide a grain agitator paddle that will vibrate the mass of grain as well as to urge it down into the seed cup, thus preventing the bridging and keeping the seed in a free flowing condition. The manner in which these objects are accomplished is set forth in the following description and accompanying drawings in which a satisfactory embodiment of the invention is shown. However, it is to be understood that the invention is not limited to the details disclosed but includes all such variations and modifications as fall within the spirit of the invention as herein expressed.

Referring to the drawing:

Figure 1 is a side view of a portion of a grain drill with parts omitted and others broken away to show the invention.

Fig. 2 is a vertical sectional view taken on the line 2—2 of Fig. 1.

The following description will make clear the construction, purpose and function of an illustrative embodiment of the invention, reference characters in the drawing referring to like reference characters in the description.

The grain drill comprises a hopper generally designated as H supported on wheels as W carrying an axle A and thereby adapted to be transported over the ground, a plurality of seed metering units S—S, an agitator shaft A, agitators as P, a drive shaft D, a power transmitting means T to drive shaft D, power transmitting means C and a plurality of ribbon tubes R—R to convey the seeds to the furrows in well-known manner.

Specifically described, the machine comprises above mentioned hopper H of a length proportionate to the number of seeding units mounted thereon, the hopper including end plates 3 carrying bearing bosses 4. End plates 3 also carry bearing bosses 5 which are supported on a bar 6 forming a part of the general framing structure of the drill not otherwise disclosed, since it forms no part of the present invention. Bar 6 has fixed therewith a plate 7 carrying a bearing 8 for above mentioned axle A and through which the structure is supported from above mentioned wheel W. Agitator shaft A extends the full length of hopper H and is journaled in above mentioned bearing bosses 4.

Seeding units S are bolted or otherwise suitably fastened to the underside of hopper H and open into said hopper through apertures as 9 so that seeds can have an unobstructed passage into seed cups 10 forming a part of above mentioned seeding units S. Metering rollers or elements 11 are mounted upon above mentioned drive shaft D which extends through the several seed cups 10. Metering rollers 11 are fluted as shown in Fig. 2 and rotate in the direction indicated. Shaft D is movable in the direction of its axis so as to vary the length of rollers 11 that extends within seed cup 10, the quantity of seed carried to the ribbon tubes R being governed by the length of flutes on rollers 11 exposed to the grain as is well understood in this art.

The means of making the axial adjustment of shaft D is well-known and not a part of this invention and therefore not shown.

Axle A supports above mentioned wheels W and also carries the power transmission arrangement T. The latter rotates shaft D in the direction indicated in Fig. 2, from rotation of axle A and has means by which the speed of rotation of shaft D may be varied. The latter forming no part of the present invention and being well-known in the art, need not be further described.

Seed is carried downward onto a gate 12 by the flutes of roller 11 as shown in Fig. 2 and measured into ribbon tubes R in a uniform stream.

Above mentioned power transmitting means C rotates shaft A in the direction indicated in Fig. 2 and comprises a sprocket 13 secured to shaft D and a sprocket 14 secured to shaft A. A chain 15 passes over sprockets 13 and 14 and a tightening idler 16 of well-known construction is employed to maintain a proper tension on chain 15.

Agitators P are fixed to shaft A and as above mentioned rotate in the above direction shown in Fig. 2. Agitator P is an improvement over the agitator at present employed and comprises a hub or boss section 17 bored to receive shaft A. A means of fastening, such as a set screw 18, secures the agitator to shaft A. Each agitator P is positioned adjacent the opening or mouth 9 of each seed cup 10 and near enough to opening 9 so as to positively force the seed into seed cup 10. Agitator P in this instance has two arms 19 and 20 spaced substantially 180° apart, being disposed in a plane normal to the axis of hub 17. Arms 19 and 20 are preferably in the form of webs which terminate in paddle portions 21 and 22 which are disposed substantially at right angles to arms 19 and 20. Paddle portions 21 and 22 are positioned for the most part at an angle to a radius extending from shaft A as shown in Fig. 2 and which positioning is an important feature of the invention. The purpose in positioning paddle portions 21 and 22 thus is to impart an outward radial thrust against the grain in all positions of agitator P. This results in an alternate lifting and dropping of the grain above paddle 21 (in the position of the parts shown) which discourages the tendency to bridge and maintains the grain in a constant state of agitation. Another result of this construction is that any tendency of the grain to become sluggish and fail to flow into seed cup 10 is avoided because paddle portion 22 will exert a downward thrust against the seeds and force them downwardly into cup 10. The fluted roller 11 will then carry a full charge in the flutes or spaces and deposit the seeds onto gate 12 whence they will drop into ribbon tubes R.

Fig. 2 indicates the lifting effect imparted to the seeds by agitator paddle 21. The raised portion 23 that has been lifted because of the shape of paddle 21 drops to the contour indicated by dotted line 24 upon further rotation of agitator paddle 21. Thus, the grain is continually lifted and dropped so as to be thoroughly agitated and the tendency of the beards to knit together and cause bridging so as to stop the flow of seeds is obviated.

As agitator paddle 22 rotates, a void 24a is formed behind the blade and which void is filled by loose seeds immediately after the passing of paddle 22. This tends to aid in keeping the grain in a continual state of looseness and agitation. It is especially effective in keeping seed cup 10 full because blade 22 is of considerable width as disclosed in Fig. 1 and because the backward and outward inclination of the blades, above described, tends to force some of the seeds downwardly so as to positively impel them into the cup.

The operation of the device is thought to be clear from the above description, sufficient to say that wheel W rotates axle A and which drives through transmission T, drive shaft D. Drive shaft D drives the fluted feed rollers 11 in well-known manner and shaft D actuates agitator shaft A through chain 15. Shaft A rotates agitator paddles P which by virtue of their inclined blade portions 21 and 22, both lift and agitate the seeds as well as to press them down into the feed cups 10. Difficult crops to seed, such for example as bearded oats, are thereby fed with dependability and in a satisfactory quantity by the device disclosed.

The above being a complete description of an illustrative embodiment of the invention, what is claimed as new and desired to be secured by Letters Patent of the United States is:

An agitator for a grain drill and the like, comprising a hub portion adapted to be secured to a shaft, webs extending outwardly from said hub portion on opposite sides thereof and substantially in a plane normal to the axis of said hub portion, a paddle portion on each web extending substantially radially from a point spaced from said hub portion substantially normal to each web, said paddle portion bending backwardly and continuing from a point spaced from the first mentioned point, in a portion directed away from the direction of rotation of said hub, said paddle portions lying in planes substantially parallel to the axis of said hub portion.

BERNARD J. SCHILL.

REFERENCES CITED

The following references are of record in the file of this patent:

UNITED STATES PATENTS

| Number | Name | Date |
|---|---|---|
| 339,578 | Preston | Apr. 6, 1886 |
| 405,042 | Johnson | Nov. 12, 1889 |
| 655,510 | Oubre | Aug. 7, 1900 |
| 2,041,770 | Libbee | May 26, 1936 |

FOREIGN PATENTS

| Number | Country | Date |
|---|---|---|
| 500,931 | Great Britain | Feb. 17, 1939 |